United States Patent
Liu et al.

(10) Patent No.: US 11,509,239 B2
(45) Date of Patent: *Nov. 22, 2022

(54) CONVERSION DEVICE HAVING REDUCED SIZE AND COST

(71) Applicant: Delta Electronics (Shanghai) CO., LTD, Shanghai (CN)

(72) Inventors: Teng Liu, Shanghai (CN); Jianping Ying, Shanghai (CN); Lifeng Qiao, Shanghai (CN); Xin Wang, Shanghai (CN); Hongwei Xiao, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 19 days.

This patent is subject to a terminal disclaimer.

(21) Appl. No.: 17/314,105

(22) Filed: May 7, 2021

(65) Prior Publication Data

US 2021/0376739 A1 Dec. 2, 2021

(30) Foreign Application Priority Data

May 26, 2020 (CN) .......................... 202010456279.X

(51) Int. Cl.
*H02M 7/23* (2006.01)
*B60L 53/30* (2019.01)
(Continued)

(52) U.S. Cl.
CPC ............... *H02M 7/23* (2013.01); *B60L 53/30* (2019.02); *H02M 3/33569* (2013.01);
(Continued)

(58) Field of Classification Search
CPC .. H02M 3/33569; H02M 5/4585; H02M 7/23; H02M 7/537; H02M 1/123;
(Continued)

(56) References Cited

U.S. PATENT DOCUMENTS 5,355,297 A * 10/1994 Kawabata ............... H02P 27/14
363/43
5,644,483 A * 7/1997 Peng ..................... H02M 7/487
363/37
(Continued)

FOREIGN PATENT DOCUMENTS

CN 103311944 A 9/2013
CN 102377192 B 11/2013
(Continued)

OTHER PUBLICATIONS

Young-Kwang Son et al.:"Analysis on current flowing through deactivated modules in parallel connected ACDC converters",May 22, 2016(May 22, 2016), pp. 761-767.
(Continued)

*Primary Examiner* — Yusef A Ahmed
(74) *Attorney, Agent, or Firm* — Qinghong Xu

(57) ABSTRACT

A conversion device includes: an inductor electrically connected to the AC power grid; a first-stage converter configured to output a bus voltage according to the AC power grid, wherein the first-stage converter includes an N-level alternating current-direct current (AC-DC) converter, and the N-level AC-DC converter includes a plurality of switch bridge arms, wherein both an upper bridge arm and a lower bridge arm of each of the plurality of switch bridge arms of the N-level AC-DC converter include a plurality of semiconductor devices connected in series, and a rated withstand voltage Vsemi of each of the semiconductor devices is greater than or equal to (Vbus*δ)/((N−1)*Nseries*λ); and a second-stage converter configured to convert the bus voltage into an output voltage to supply energy to the load.

12 Claims, 22 Drawing Sheets

(51) Int. Cl.
  *H02M 3/335* (2006.01)
  *H02M 7/217* (2006.01)
  *H02M 7/537* (2006.01)
  *H02M 5/458* (2006.01)
  *H02M 7/219* (2006.01)
  *H02M 1/12* (2006.01)

(52) U.S. Cl.
  CPC ......... *H02M 5/4585* (2013.01); *H02M 7/217* (2013.01); *H02M 7/219* (2013.01); *H02M 7/537* (2013.01); *B60L 2210/10* (2013.01); *B60L 2210/30* (2013.01); *B60L 2210/40* (2013.01); *H02M 1/123* (2021.05); *H02M 1/126* (2013.01)

(58) Field of Classification Search
  CPC .. H02M 1/126; H02M 1/0032; H02M 1/0077; H02M 1/088; H02M 3/01; H02M 7/4807; H02M 7/4815; H02M 7/487; H02M 7/493; H02M 1/0074; H02M 7/219; H02M 7/2173; H02M 7/08; H02M 7/483; H02M 1/44; B60L 53/30; B60L 2210/10; B60L 2210/30; B60L 2210/40
  See application file for complete search history.

(56) References Cited

U.S. PATENT DOCUMENTS

| | | | |
|---|---|---|---|
| 6,385,057 B1 | 5/2002 | Barron | |
| 8,811,048 B2* | 8/2014 | Zhang | H02P 27/14 363/45 |
| 9,473,021 B2* | 10/2016 | Hsiao | H02J 3/381 |
| 10,770,987 B2* | 9/2020 | Kumar | H02H 1/043 |
| 10,940,813 B2* | 3/2021 | Kumar | B23K 9/1043 |
| 2003/0218838 A1* | 11/2003 | Poulsen | H02M 7/062 361/23 |
| 2006/0227483 A1* | 10/2006 | Akagi | H02M 1/12 361/118 |
| 2009/0109713 A1* | 4/2009 | Schnetzka | H02M 5/4585 361/699 |
| 2009/0237962 A1* | 9/2009 | Yun | H02M 7/49 363/37 |
| 2010/0148508 A1* | 6/2010 | Garcia | H02J 3/50 290/44 |
| 2010/0156185 A1* | 6/2010 | Kim | H02J 3/387 307/82 |
| 2011/0089693 A1* | 4/2011 | Nasiri | F03D 7/0272 290/44 |
| 2011/0141774 A1* | 6/2011 | Kane | H02M 5/4585 363/44 |
| 2013/0308352 A1* | 11/2013 | Wu | H02M 1/44 363/39 |
| 2014/0001759 A1* | 1/2014 | Gupta | H02J 3/381 290/44 |
| 2014/0140112 A1* | 5/2014 | Zhou | H02M 1/126 363/39 |
| 2014/0210271 A1 | 7/2014 | Toyoda | |
| 2014/0211520 A1* | 7/2014 | Zhang | H02M 1/126 363/37 |
| 2014/0254228 A1 | 9/2014 | Ying et al. | |
| 2014/0268933 A1* | 9/2014 | Zhou | H02M 1/12 363/44 |
| 2016/0268950 A1* | 9/2016 | Cho | H02P 27/14 |
| 2016/0268951 A1* | 9/2016 | Cho | H02M 1/14 |
| 2016/0315540 A1* | 10/2016 | Dilley | H02M 7/797 |
| 2016/0322809 A1 | 11/2016 | Wang et al. | |
| 2017/0005565 A1* | 1/2017 | Bai | H02M 1/4258 |
| 2017/0063260 A1* | 3/2017 | Li | H02P 5/74 |
| 2018/0041035 A1* | 2/2018 | Ying | H02J 3/36 |
| 2018/0041110 A1* | 2/2018 | Liu | H02P 29/50 |
| 2018/0131271 A1* | 5/2018 | Ying | H02M 5/4585 |
| 2018/0278168 A1* | 9/2018 | Brown | H02J 7/022 |
| 2018/0342943 A1* | 11/2018 | Yuan | H02M 1/32 |
| 2019/0067932 A1* | 2/2019 | Li | H02M 7/2173 |
| 2019/0312425 A1* | 10/2019 | Xiao | H02H 3/165 |
| 2020/0177100 A1* | 6/2020 | Wang | H02M 1/083 |
| 2021/0165933 A1* | 6/2021 | Larsson | H02J 3/00 |
| 2021/0273557 A1* | 9/2021 | Liu | H02M 1/4233 |
| 2021/0384816 A1* | 12/2021 | Xiao | H02M 1/32 |
| 2021/0391820 A1* | 12/2021 | Morris | H02P 23/14 |
| 2021/0408915 A1* | 12/2021 | Fu | H02M 1/44 |
| 2022/0190744 A1* | 6/2022 | Everts | H02M 1/4216 |

FOREIGN PATENT DOCUMENTS

| | | |
|---|---|---|
| CN | 103401467 A | 11/2013 |
| CN | 104795986 B | 5/2017 |
| CN | 108988447 A | 12/2018 |
| CN | 106786694 B | 3/2019 |
| EP | 0899859 A2 | 3/1999 |
| WO | 9949559 A2 | 9/1999 |

OTHER PUBLICATIONS

Onur Cetin N et al: "Compatibility Issues Between the Filter and PWM Unit in Three-Phase AC Motor Drives Utilizing the Pure Sine Filter Configuration", Nov. 1, 2011 (Nov. 1, 2011), pp. 2559-2569.
The Extended European Search Report dated Sep. 23, 2021 for EP patent application No. 21170736.9.
Vedreno-Santos Francisco et al:"Design considerations for high-power converters interfacing 10 MW superconducting wind power generators",Oct. 6, 2017 (Oct. 6, 2017), pp. 1461-1467.
Backlund B et al: "Topologies, voltage ratings and state of the art high power semiconductor devices for medium voltage wind energy conversion", Jun. 24, 2009 (Jun. 24, 2009), pp. 1-6.
Hitachi Power Semiconductor Device et al: "(High Voltage IGBT Module) Application Manual",Dec. 30, 2009 (Dec. 30, 2009).
Tu Hao et al.: "Extreme Fast Charging of Electric Vehicles: A Technology Overview", Dec. 10, 2019 (Dec. 10, 2019), pp. 861-878.
Son Myeongsu et al: "Unidirectional Vienna Converter Design Based On Series-Connected Component", Nov. 25, 2019 (Nov. 25, 2019), pp. 1-6.
The Extended European Search Report dated Sep. 23, 2021 for EP patent application No. 21171009.0.
The Extended European Search Report dated Dec. 16, 2021 for EP patent application No. 21171009.0.

* cited by examiner

CONVERSION DEVICE HAVING REDUCED SIZE AND COST

CROSS REFERENCE

This application is based upon and claims priority to Chinese Patent Application No. 202010456279.X, filed on May 26, 2020, the entire contents of which are incorporated herein by reference.

TECHNICAL FIELD

The present disclosure relates to the technical field of power electronics, in particular, to a conversion device.

BACKGROUND

In recent years, compared with traditional alternating current power distribution systems, power transmission methods represented by direct current have received more and more attention from an industry. With development of new energy technologies and an increase of direct current loads, advantages of direct current power transmission combined with new energy power generation have become more prominent. The direct current power transmission removes a conversion link between direct current (DC) and alternating current (AC) to reduce system cost. On a user side, with development of internet technologies, scale of a data center has reached several megawatts, or even tens of megawatts. An electric vehicle industry develops fast, and the number of electric vehicles in China is increasing rapidly. Growth prospect of the electric vehicles is broad, and development of the electric vehicles gradually expands requirements for high-power charging piles.

It should be noted that the information disclosed in the Background section above is only for enhancing the understanding of the background of the present disclosure, and thus may include information that does not constitute prior art known to those of ordinary skill in the art.

SUMMARY

According to a first aspect of the present invention, a conversion device is provided, which is connected between an alternating current (AC) power grid and a load, wherein the conversion device comprises:

an inductor electrically connected to the AC power grid:

a first-stage converter having a first terminal electrically connected to the inductor and a second terminal electrically connected to a bus, and the first-stage converter being configured to output a bus voltage according to the AC power grid, wherein the first-stage converter comprises an N-level alternating current-direct current (AC-DC) converter, and the N-level AC-DC converter comprises a plurality of switch bridge arms, wherein both an upper bridge arm and a lower bridge arm of each of the plurality of switch bridge arms of the N-level AC-DC converter include a plurality of semiconductor devices connected in series, and a rated withstand voltage Vsemi of each of the semiconductor devices is greater than or equal to (Vbus*δ)/((N−1)*Nseries*λ), where Vbus represents the bus voltage, δ represents bus fluctuation, N represents a number of levels of the first-stage converter, λ represents a voltage derating coefficient of the semiconductor device, and λ≤1, and Nseries represents a number of semiconductor devices connected in series, and Nseries≥2; and a second-stage converter having a first terminal electrically connected to the bus and a second terminal electrically connected to the load, and the second-stage converter being configured to convert the bus voltage into an output voltage to supply energy to the load.

In some embodiments, the load comprises a direct current (DC) load, and the second-stage converter comprises a direct current-direct current (DC-DC) converter, the DC-DC converter is electrically connected to the DC load.

In some embodiments, the load comprises an alternating current (AC) load, and the second-stage converter comprises a direct current-alternating current (DC-AC) converter, the DC-AC converter is electrically connected to the AC load.

In some embodiments, the first-stage converter comprises at least two alternating current-direct current (AC-DC) converters connected in parallel.

In some embodiments, the second-stage converter comprises at least two direct current-direct current (DC-DC) converters or direct current-alternating current (DC-AC) converters, the DC-DC converters or the DC-AC converters being connected in parallel or connected in series.

In some embodiments, the conversion device further comprises a controller configured to detect power of the load and controls operating states of the at least two AC-DC converters connected in parallel according to the power of the load.

In some embodiments, in case of the load is fully loaded, all AC-DC converters work.

In some embodiments, in case of the load is lightly loaded or half loaded, the controller controls a portion of the at least two AC-DC converters connected in parallel to work, and controls remaining of the at least two AC-DC converters connected in parallel not to work.

In some embodiments, the conversion device further comprises a controller and a direct current (DC) circuit breaker, and the DC circuit breaker is disposed between the first-stage converter and the second-stage converter, wherein the DC circuit breaker is electrically connected with the controller, and the DC circuit breaker is controlled to work according to a control signal sent by the controller.

In some embodiments, the AC-DC converter comprises any one of following: a two-level rectifier, a three-level Vienna rectifier, and a three-level neutral point clamped converter.

In some embodiments, the conversion device further comprises a filtering network, having a first terminal, a second terminal and a third terminal, wherein a first resistance-capacitance circuit is disposed between the first terminal and the third terminal of the filtering network, and a second resistance-capacitance circuit is disposed between the second terminal and the third terminal of the filtering network, and the first terminal of the filtering network is electrically connected to the AC power grid, the second terminal of the filtering network is connected to a terminal of the bus or the second terminal of the second-stage converter, and the third terminal of the filtering network is grounded through a first capacitor.

In some embodiments, a second capacitor and a third capacitor connected in series are disposed across the bus, and the second terminal of the filtering network is electrically connected between the second capacitor and the third capacitor.

In some embodiments, a fourth capacitor is connected across the bus.

In some embodiments, the inductor comprises an inductor integrated by a common-mode inductor and a differential-mode inductor, and the inductor is disposed between the AC power grid and the first-stage converter.

In some embodiments, the inductor comprises a differential-mode inductor and a common-mode inductor, the differential-mode inductor is connected between the AC power grid and the first-stage converter, and the common-mode inductor is disposed between the AC power grid and the second terminal of the second-stage converter.

In some embodiments, the inductor comprises a differential-mode inductor and a common-mode inductor, the differential-mode inductor is connected between the AC power grid and the first-stage converter, and the common-mode inductor is disposed between the first terminal and the second terminal of the filtering network.

In some embodiments, the first resistance-capacitance circuit comprises a first resistor and a fifth capacitor connected in series, and the second resistance-capacitance circuit comprises a second resistor and a sixth capacitor connected in series.

It should be noted that the above general description and the following detailed description are merely exemplary and explanatory and should not be construed as limiting of the disclosure.

BRIEF DESCRIPTION OF THE DRAWINGS

The accompanying drawings, which are incorporated in the specification and constitute a part of the specification, show exemplary embodiments of the present disclosure. The drawings along with the specification explain the principles of the present disclosure. It is apparent that the drawings in the following description show only some of the embodiments of the present disclosure, and other drawings may be obtained by those skilled in the art without departing from the drawings described herein.

DETAILED DESCRIPTION

Figure 1:
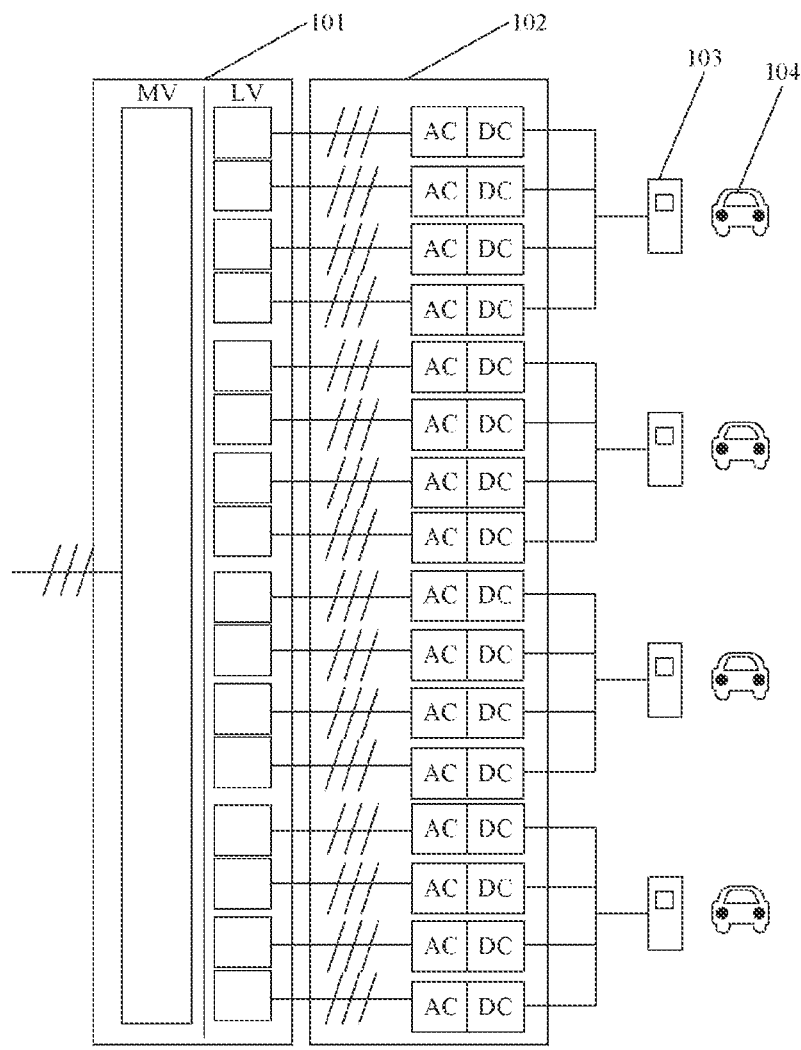
FIG. 1 schematically shows a structural schematic diagram of a conversion device using a medium-voltage transformer in the related art.

Example embodiments will now be described more fully with reference to the accompanying drawings. However, the embodiments can be implemented in a variety of forms and should not be construed as being limited to the examples set forth herein; rather, these embodiments are disposed so that the present disclosure will be more complete so as to convey the idea of the exemplary embodiments to those skilled in this art.

In addition, the features, structures, or characteristics described above may be combined in any suitable manner in one or more embodiments. In the description below, numerous specific details are set forth to provide a thorough understanding of the embodiments of the present disclosure. However, those skilled in the art will appreciate that the technical solution of the present disclosure may be practiced without one or more of the specific details, or other methods, components, apparatus, steps and the like may be employed. In other instances, well-known methods, apparatus, implements or operations are not shown or described in detail to avoid obscuring various aspects of the present disclosure.

Some of the block diagrams shown in the figures are functional entities and do not necessarily correspond to physically or logically separate entities. These functional entities may be implemented in software, or implemented in one or more hardware modules or integrated circuits, or implemented in different networks and/or processor devices and/or microcontroller devices.

Flowcharts shown in the drawings are only exemplary illustrations, and it is not necessary to include all contents and operations/steps, nor to be executed in an order described. For example, some of the operations/steps can also be decomposed, and some of the operations/steps can be merged or partially merged, so an order of actual execution may change according to actual situations.

Traditional conversion devices have many problems in high-power applications. As shown in FIG. 1, in a topology structure of a conversion device that provides a charging power source 103 for an electric vehicle 104, a primary side of a medium-voltage transformer 101 is connected to a medium-voltage (MV) power grid, and multiple windings on a secondary side provide a low-voltage (LV) alternating current output. The medium-voltage transformer 101 can realize medium voltage isolation, so a power electronic converter 102 in a post-stage can adopt a non-isolated scheme. This scheme has advantages of high full-load efficiency (98%), mature technology and high reliability, but a transformer used by this scheme has a large volume. In addition, in a case of a light load output, it has disadvantages of low efficiency and high harmonic content. For example, at a system power of 2.4 MW, if a light load (100 kW) is outputted, the efficiency is only 92.5%. In actual applications, there are fewer cases of a full load, and most of the cases are operated under a light load and a half load.

Figure 2:
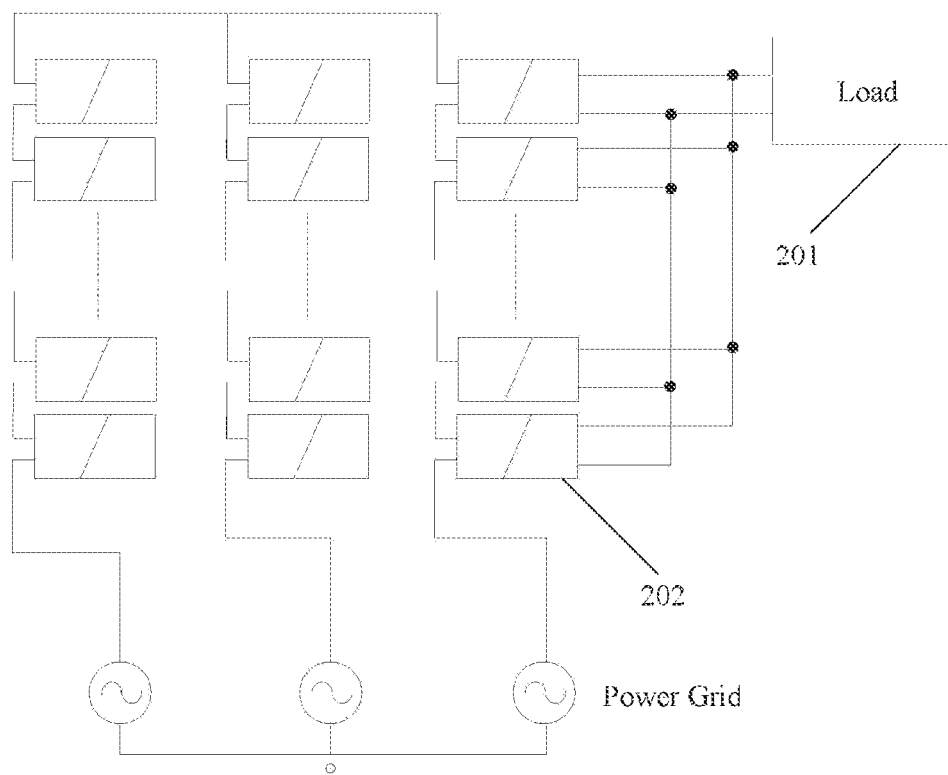
FIG. 2 schematically shows a structural schematic diagram of a conversion device using a cascaded H-bridge structure in the related art.

As shown in FIG. 2, in the conversion device that uses the traditional medium-voltage scheme to supply power to a load 201, a cascaded structure of a module 202 is adopted. This scheme has advantages of mature technology and reliability, but a DC bus capacitor of the module 202 is disposed in each of single-phase bridge arms, and phase current of each phase flowing through capacitors of each phase alone will cause power to fluctuate at double frequency. As a result, a large number of capacitors need to be configured to reduce ripple voltages of the capacitors, which will cause a decrease in power density of a power module and an increase in size of the system.

Based on the above problems, a concept of medium voltage DC micro-grid has been proposed. A DC power grid combined with new energy and energy storage technologies meets needs of rapid development of the data center and the high-power vehicle charging piles, which can achieve local power generation and nearby electricity consumption to reduce the cable loss. In addition, DC may not cause reactive power loss, and there have no reactive power balance and stability problems, which can improve the system efficiency and reliability of the power grid operation.

A basic topology structure of the medium-voltage DC micro-grid includes an AC/DC converter connected to an AC power grid, and the AC/DC converter controls an output DC bus. AC/DC converters usually use high-voltage semiconductor devices. Since operating frequency of high-voltage semiconductor devices is low, a filter need to be designed to have a lower cut-off frequency, which leads to an increase in the size and cost of the filter, which in turn leads to an increase in the size and cost of the conversion device between the AC grid and the load.

In summary, how to reduce size and cost of the conversion device is a technical problem that needs to be solved urgently.

In the related art, an Alternating Current/Direct Current (AC/DC) converter in a medium-voltage DC micro-grid converts electrical energy of an AC power grid into a DC bus output. According to current industry practice, a medium-voltage AC voltage is ≥1 kVAC, and an a medium-voltage DC voltage is ≥1.5 kVDC.

The operating frequency of high-voltage semiconductor devices used in the AC/DC converter is low, so that a cut-off frequency of the filter is low, which will increase size and cost of the filter and the conversion device.

Exemplary embodiments provide a conversion device to reduce the size and cost of the conversion device.

Figure 3:
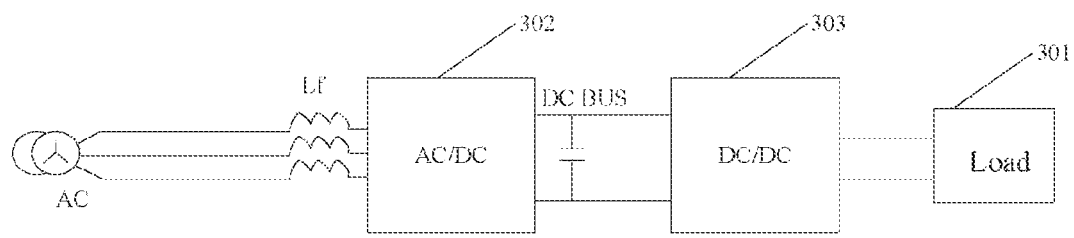
FIG. 3 schematically shows a structural schematic diagram of a conversion device in an embodiment of the present disclosure.

As shown in FIG. 3, an embodiment of the present disclosure provides a conversion device connected between an Alternating Current (AC) grid and a load 301. The conversion device includes an inductor Lf, a first-stage converter 302 and a second-stage converter 303. The inductor Lf is electrically connected to the AC power grid. A first terminal of the first-stage converter 302 is electrically connected to the inductor Lf, and a second terminal of the first-stage converter 302 is electrically connected to a Direct Current BUS (DC bus, i.e. bus), and the first-stage converter 302 is configured to output a bus voltage according to the AC grid. A first terminal of the second-stage converter 303 is electrically connected to the bus and a second terminal of the second-stage converter 303 is electrically connected to the load 301, and the second-stage converter 303 is configured to convert the bus voltage into an output voltage to provide energy to the load 301.

In this embodiment of the present disclosure, the first-stage converter 302 may be an N-level Alternating Current to Direct Current (AC-DC) converter. The N-level AC-DC converter includes a plurality of switch bridge arms, wherein both an upper bridge arm and a lower bridge arm of each of the plurality of switch bridge arms of the N-level AC-DC converter include a plurality of semiconductor devices connected in series, and a rated withstand voltage Vsemi of each of the semiconductor devices is greater than or equal to $(Vbus*\delta)/((N-1)*Nseries*\lambda)$, where Vbus represents the bus voltage, $\delta$ represents bus fluctuation, N represents a number of levels of the first-level converter, $\lambda$ represents a voltage derating coefficient of the semiconductor device, and $\lambda \leq 1$, and Nseries represents a number of semiconductor devices connected in series, and Nseries≥2.

When a structure in which multiple semiconductor devices are connected in series is adopted, semiconductor devices having high switching frequencies which are connected in series can be used. For example, Three Insulated Gate Bipolar Transistor (IGBT) switches with a withstand voltage of 1700V connected in series can be used to replace an IGBT with a withstand voltage of 4500V. Since the switching frequency of the IGBT with the withstand voltage of 1700V can reach a highest switching frequency of 3 kHz, which is much larger than that of the IGBT with the withstand voltage of 4500V. Therefore, the converter can operate at a relatively high switching frequency, which can increase the cut-off frequency of the filter, reduce the size of the filter, and reduce the cost of the filter.

Figure 4:
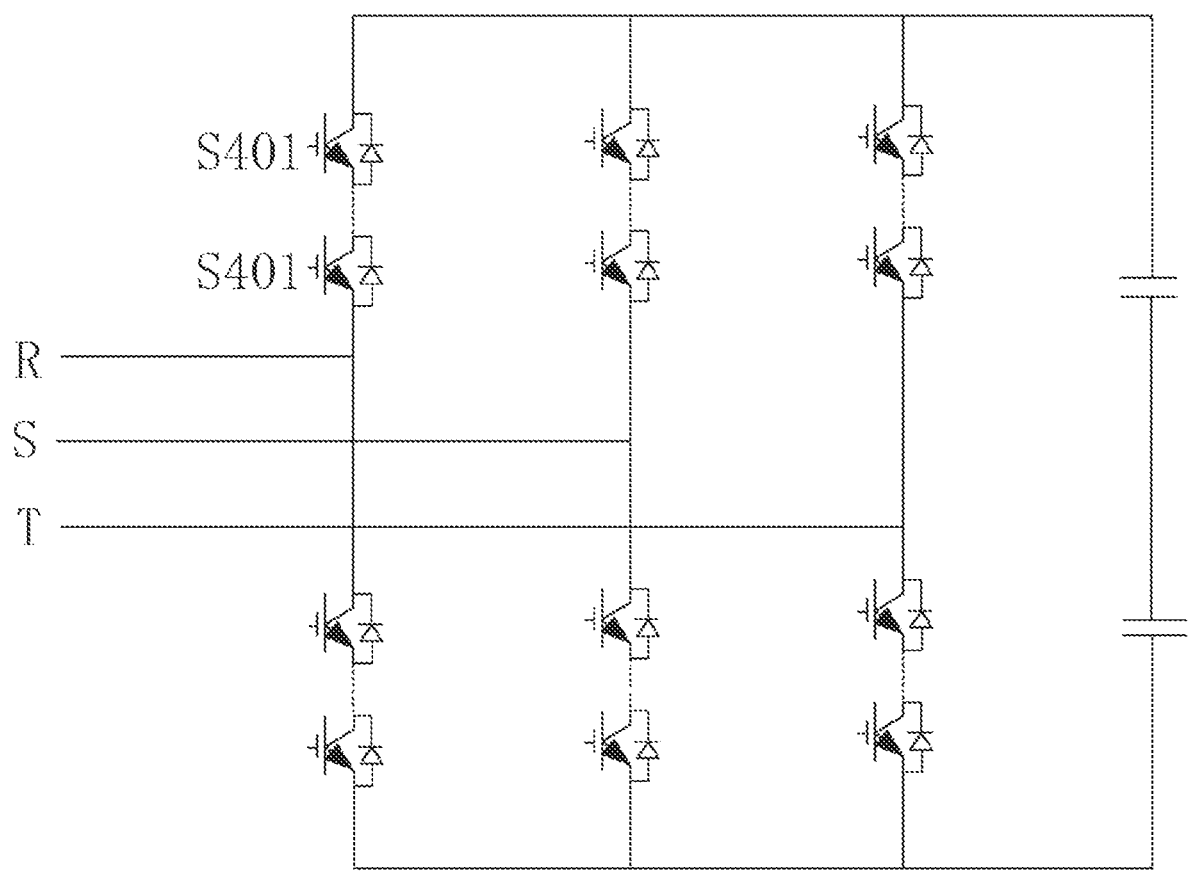
FIG. 4 schematically shows a schematic diagram of an AC/DC topology structure in an embodiment of the present disclosure.
Figure 5:
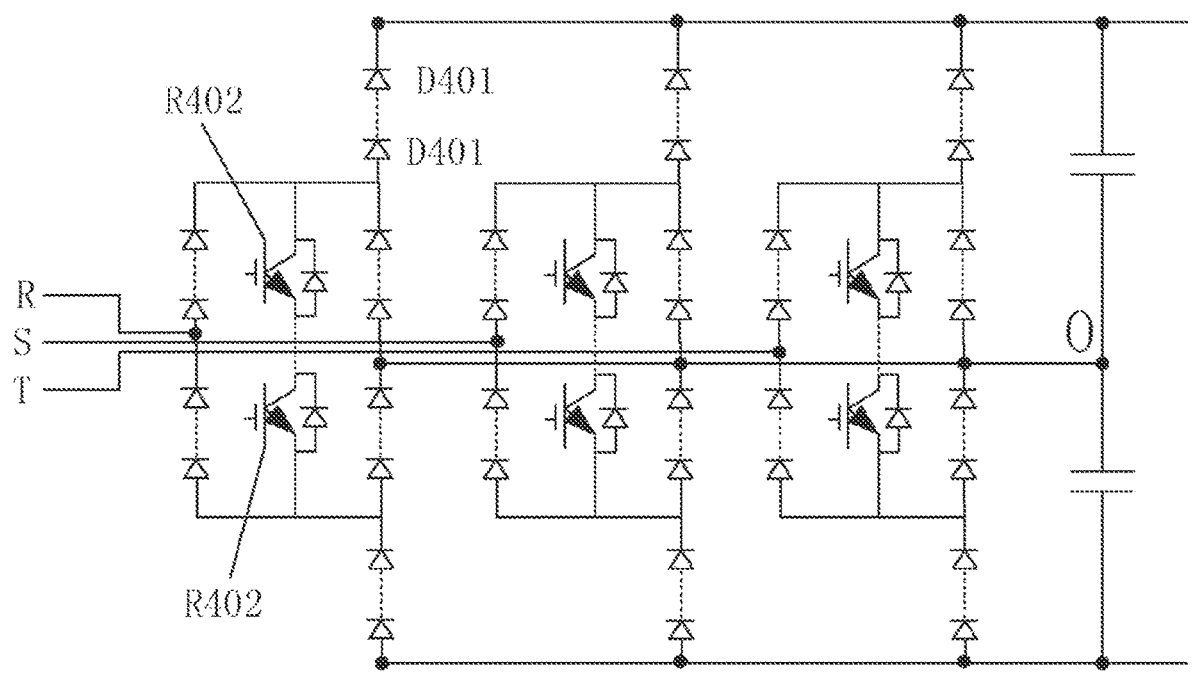
FIG. 5 schematically shows a schematic diagram of another AC/DC topology structure in an embodiment of the present disclosure.
Figure 6:
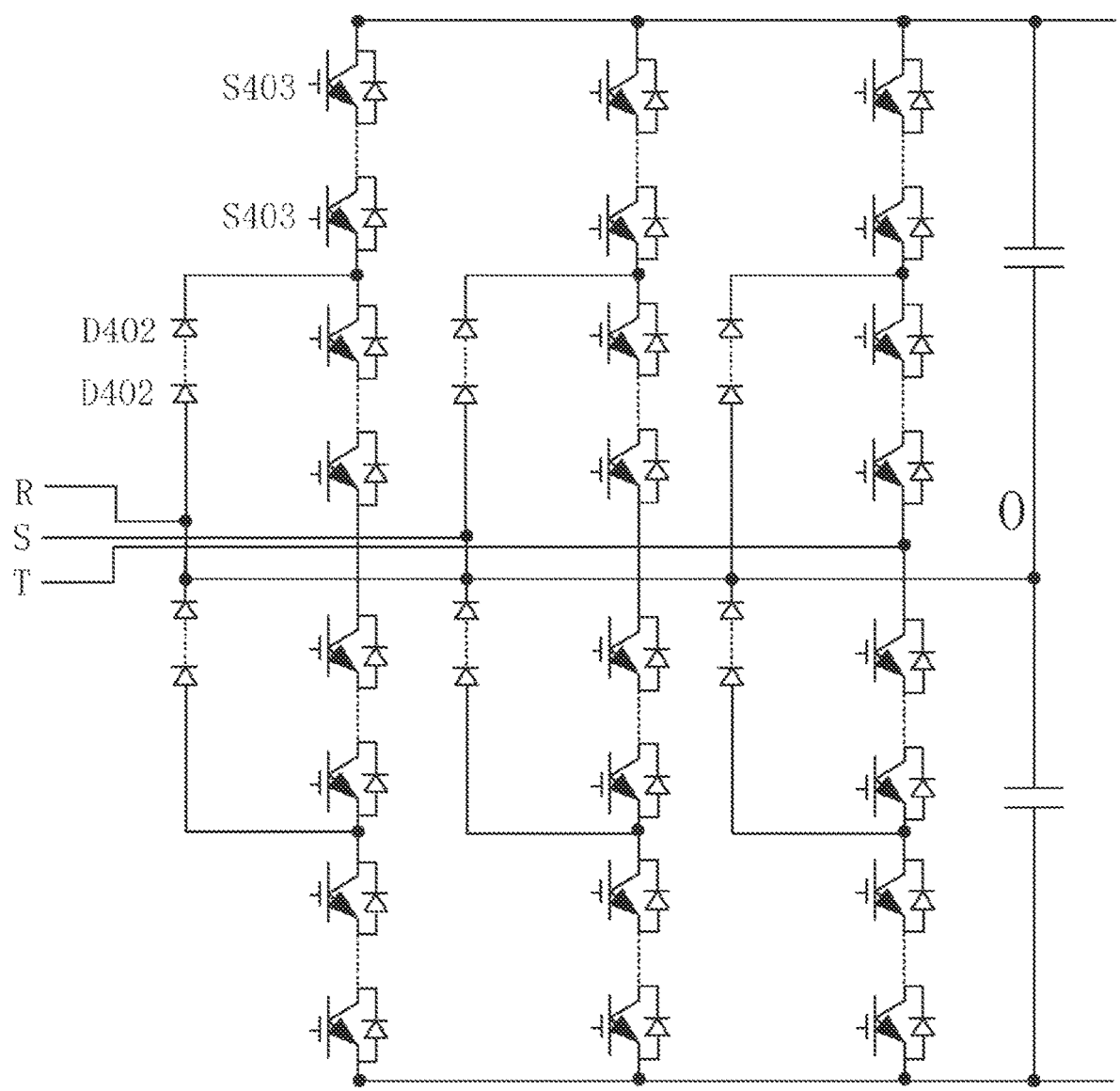
FIG. 6 schematically shows a schematic diagram of yet another AC/DC topology structure in an embodiment of the present disclosure.

In the embodiments of the present disclosure, the first-stage converter may be a two-level or three-level AC/DC converter, and is not limited thereto. As shown in FIGS. 4, 5, and 6, the topology structure of the AC/DC converter includes, but is not limited to, a two-level rectifier, a three-level Vienna rectifier, and a three-level neutral point clamped converter.

As shown in FIG. 4, in the three-phase two-level rectifier, the upper bridge arm and the lower bridge arm of each of the phases respectively includes two semiconductor devices, that is, power tube S401, connected in series. The power tube shown in FIG. 4 is an IGBT, but it is not limited to this in practical applications.

In the prior art, a bridge arm of each of the phases of the three-phase three-level Vienna rectifier includes a bidirectional switch composed of one power tube and four diodes, and an upper diode and a lower diode (i.e. two diodes) having freewheeling function. In the three-phase three-level Vienna rectifier as shown in FIG. 5, the power tube of the bridge arm of each of the phases of the three-phase three-level Vienna rectifier in the prior art is replaced by two power tubes S402 connected in series, and each diode of each bridge arm of the three-phase three-level Vienna rectifier in the prior art is replaced by two diodes D401 connected in series.

In the prior art, a bridge arm of each of the phases of the three-phase three-level neutral point clamped converter includes four power tubes and two diodes. In the three-phase three-level neutral point clamped (NPC) converter as shown in FIG. 6, the power tubes of the bridge arm of each of the phases of the three-phase three-level neutral point clamped converter in the prior art are replaced by two power tubes S403 connected in series, and each diode of each bridge arm of the three-phase three-level neutral point clamped converter in the prior art is replaced by two diodes D402 connected in series.

In the exemplary embodiments of the present disclosure, the load may be a DC load, and correspondingly, the second-stage converter may be a DC-DC converter, and the DC-DC converter is electrically connected to the DC load. In addition, the load may also be an AC load, and correspondingly, the second-stage converter may be a DC-AC converter, and the DC-AC converter is electrically connected to the AC load.

When the second-stage converter is a Direct Current-Direct Current converter, that is, a DC/DC converter, the DC-DC converter can have multiple topology structures and a single module at a primary side of the DC-DC converter can adopt a two-level or multi-level topology. The semiconductor devices of the DC-DC converter can use a single semiconductor device or a structure with multiple semiconductor devices connected in series, in parallel or in series-parallel. A secondary side and a primary side of the DC-DC converter can use an output mode of isolating output or non-isolating output, and the secondary side of the DC-DC converter can be connected in parallel or in series or in series-parallel according to the needs of the load.

Figure 7:
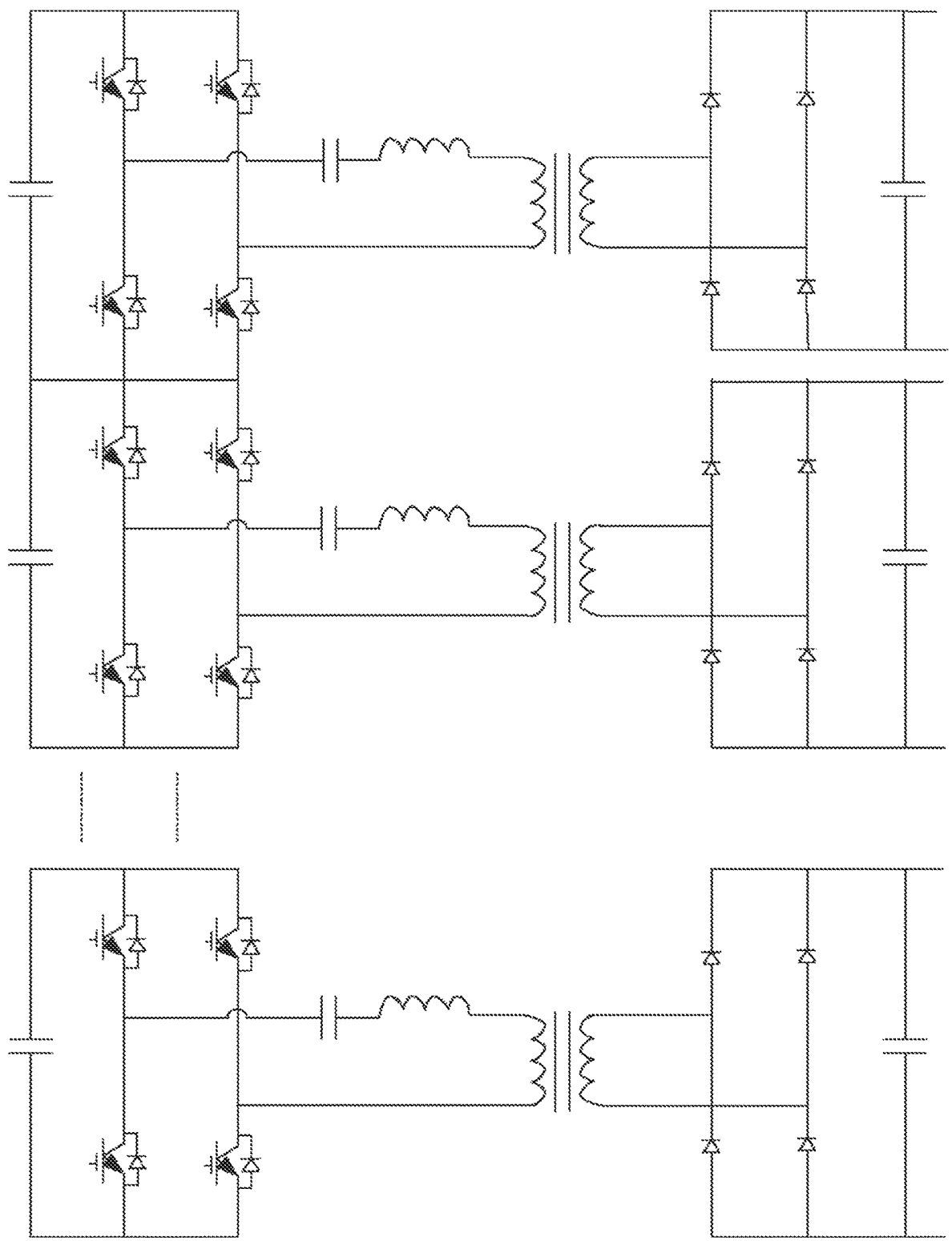
FIG. 7 schematically shows a schematic diagram of a DC/DC topology structure in an embodiment of the present disclosure.
Figure 8:
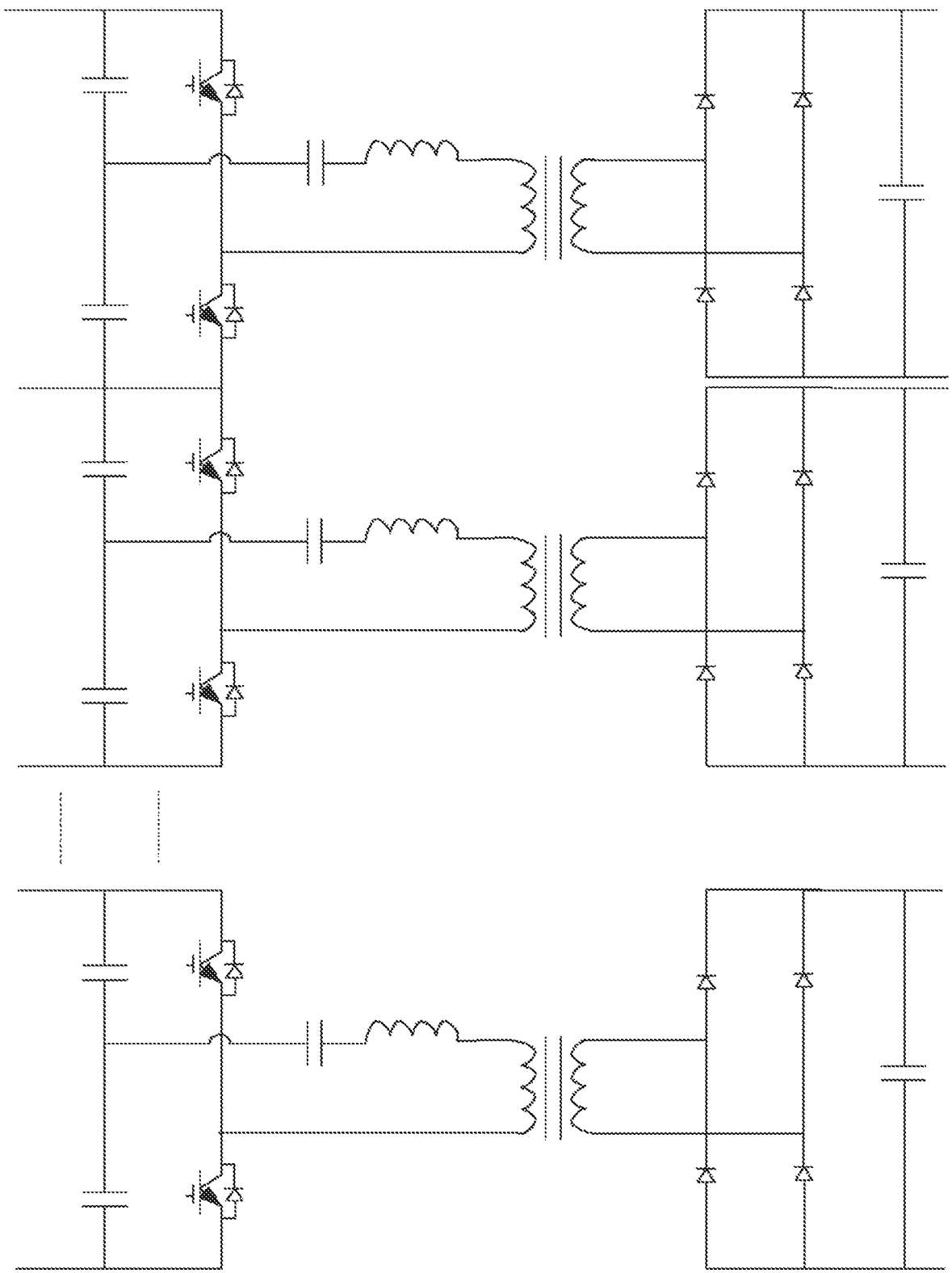
FIG. 8 schematically shows a schematic diagram of another DC/DC topology structure in an embodiment of the present disclosure.
Figure 9:
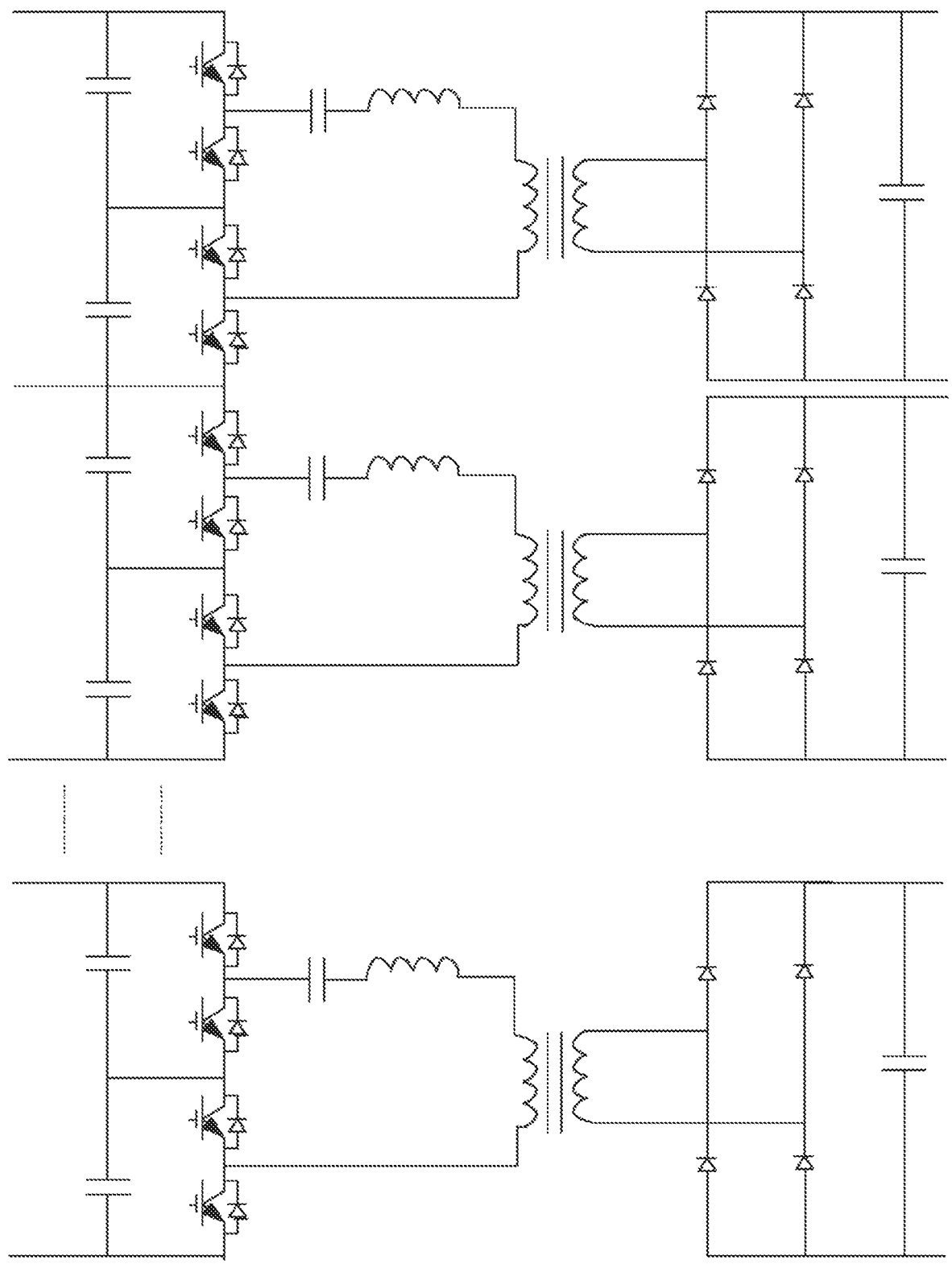
FIG. 9 schematically shows a schematic diagram of yet another DC/DC topology structure in an embodiment of the present disclosure.
Figure 10:
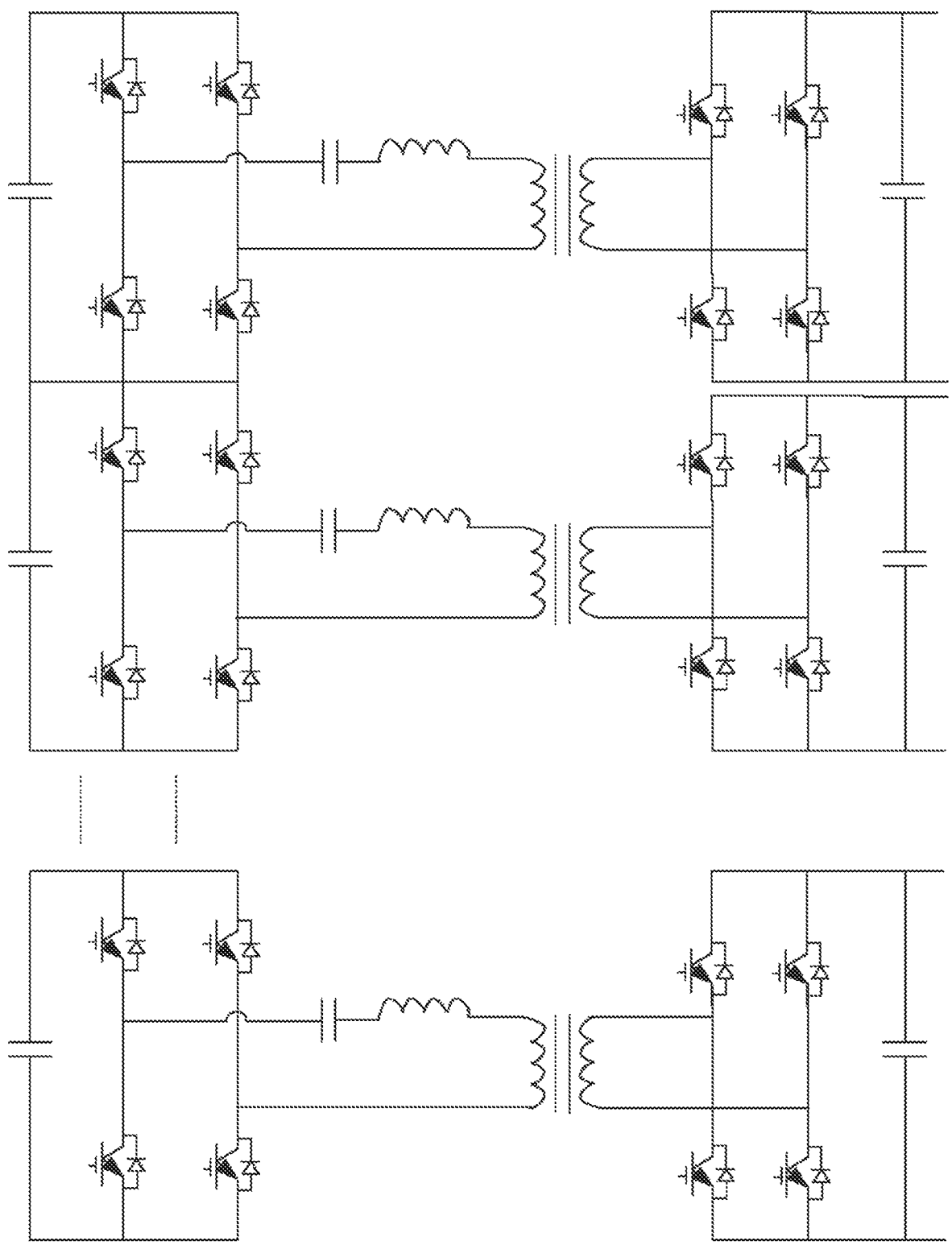
FIG. 10 schematically shows a schematic diagram of yet another DC/DC topology structure in an embodiment of the present disclosure.
Figure 11:
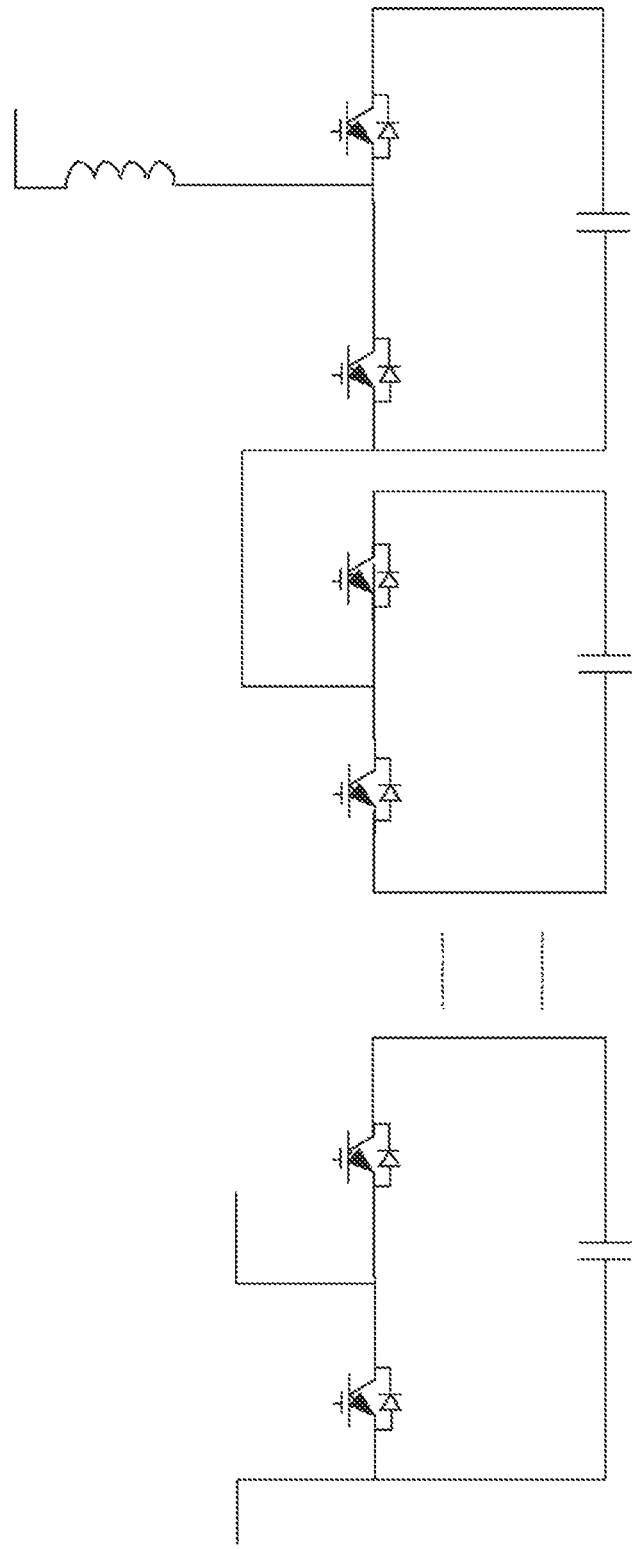
FIG. 11 schematically shows a schematic diagram of yet another DC/DC topology structure in an embodiment of the present disclosure FIG. 12 schematically shows a structural schematic diagram of yet another conversion device in an embodiment of the present disclosure.

For example, the DC-DC converter of the embodiments of the present disclosure may be: a full-bridge LLC DC/DC converter having primary sides connected in series as shown in FIG. 7, a half-bridge LLC DC/DC converter having primary sides connected in series as shown in FIG. 8, a three-level half-bridge LLC DC/DC converter having primary sides connected in series as shown in FIG. 9, a Dual-Active-Bridge (DAB) DC/DC bidirectional converter having primary sides connected in series as shown in FIG. 10, and a non-isolated DC/DC bidirectional converter as shown in FIG. 11.

Figure 12:
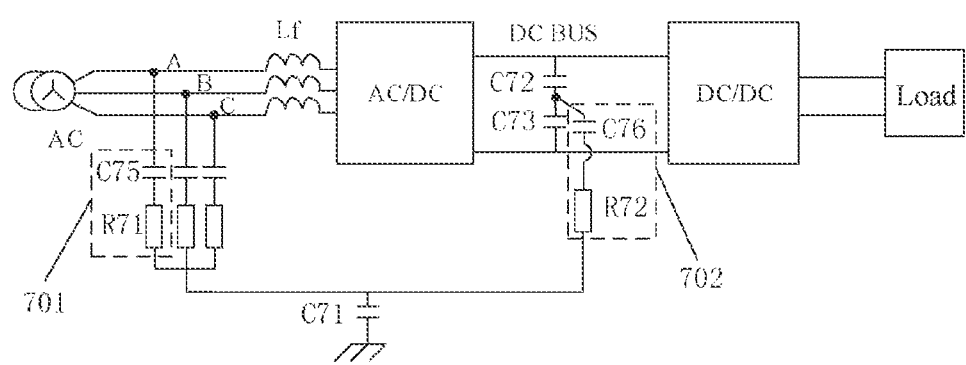

As shown in FIG. 12, the conversion device may further include a filtering network, and the filtering network has a first terminal, a second terminal and a third terminal. A first resistance-capacitance circuit 701 is disposed between the first terminal and the third terminal of the filtering network, and a second resistance-capacitance circuit 702 is disposed between the second terminal and the third terminal of the filtering network. The first terminal of the filtering network is electrically connected to the AC power grid, and the third terminal of the filtering network is grounded through a first capacitor C71.

The first resistance-capacitance circuit 701 includes a first resistor R71 and a fifth capacitor C75 connected in series, and the second resistance-capacitance circuit 702 includes a second resistor R72 and a sixth capacitor C76 connected in series. As shown in FIG. 12, the first terminal of the filtering network is a three-phase access terminal, and each of three phases includes the first resistance-capacitance circuit 701. One terminals of the first resistance-capacitance circuits 701 of three phases respectively correspond to three-phase input terminals of the three-phase AC power grid, and the other terminals of the first resistance-capacitance circuits 701 of three phases are connected with the third terminal of the filtering network. The second terminal of the filtering network is a single-phase access terminal, and one terminal of the second resistance-capacitance circuit 702 is connected to the second terminal of the filtering network, and the other terminal of the second resistance-capacitance circuit 702 is connected to the third terminal of the filtering network.

As shown in FIG. 12, the second terminal of the filtering network is electrically connected to a terminal of the bus. For example, a second capacitor C72 and a third capacitor C73 connected in series are disposed between the buses, and the second terminal of the filtering network is electrically connected between the second capacitor C72 and the third capacitor C73.

Figure 13:
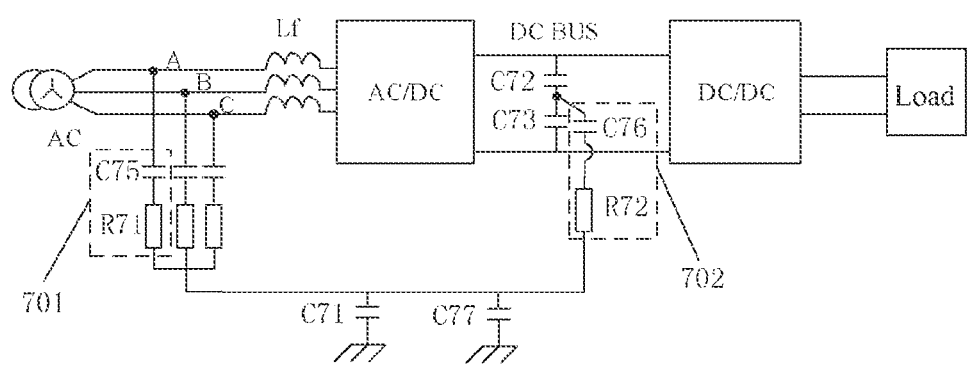
FIG. 13 schematically shows a structural schematic diagram of yet another conversion device in an embodiment of the present disclosure.

As shown in FIG. 13, the difference from FIG. 12 is that the third terminal of the filtering network can also be grounded through the first capacitor C71 and a seventh capacitor C77, respectively.

Figure 14:
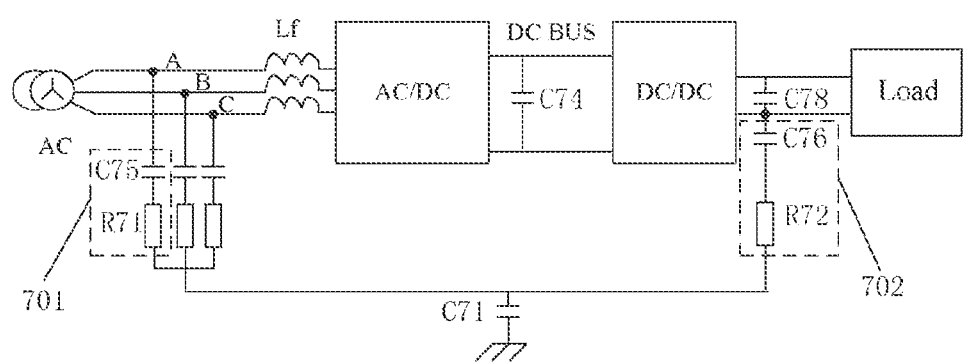
FIG. 14 schematically shows a structural schematic diagram of yet another conversion device in an embodiment of the present disclosure.

As shown in FIG. 14, the difference from FIG. 12 is that a fourth capacitor C74 can be disposed between the buses. The second terminal of the filtering network is electrically connected to the second terminal of the second-stage converter. For example, an eighth capacitor C78 is also connected between the second terminals of the second-stage converter. One terminal of the second resistance-capacitance circuit is electrically connected to one terminal of the second terminals of the second-stage converter. In one embodiment, one terminal of the second resistance-capacitance circuit is electrically connected to a ground terminal of the second terminals of the second-stage converter.

In the embodiment of the present disclosure, as shown in FIG. 12, FIG. 13, and FIG. 14, the inductor may be an inductor Lf integrated by a common-mode inductor and differential-mode inductor. As shown in FIGS. 15, 16, 17, 18, and 19, the inductor may include a differential-mode inductor Ldiff and a common-mode inductor Lcm independent from each other.

When the conversion device is operating, due to the use of Pulse Width Modulation (PWM) modulation technology, a common-mode voltage of the system may be generated. Furthermore, since the common-mode voltage is superimposed with a differential-mode voltage, voltages at positions such as an AC input terminal and a midpoint of a bus are increased with respect to ground. In addition, due to presence of a common-mode loop, a common-mode current may be generated in the loop. If no processing was performed to the common-mode current, the problems such as insulation, interference, and heat dissipation may be caused.

In addition, in the embodiments of the present disclosure, a common-mode inductor is used in the filtering network to form a common-mode filtering network.

As shown in FIG. 12, FIG. 13, and FIG. 14, the inductor Lf is an electric reactor integrated by a common-mode inductor and a differential-mode inductor, which can filter both a differential-mode signal and a common-mode signal. As shown in FIG. 12, one terminal of the common-mode filtering network is connected to a midpoint of the bus, that is, a connection point of the second capacitor C72 and the third capacitor C73, and the other terminal is connected with the AC power grid and is grounded through a safety capacitor C71. In this way, the voltage at the midpoint of the bus is forced to a potential close to ground. The power grid side is also connected to ground via the resistance-capacitance circuit to reduce the voltage of the power grid side with respect to ground.

A design of the common-mode filtering network can effectively reduce both the voltage at the midpoint of the bus and the voltage of the power grid side with respect to ground, and limit amplitude of the common-mode current.

Specific indicators for reducing voltages both at the midpoint of the bus and the power grid side with respect to ground are as follows: under rated operating conditions, AC input voltage with respect to ground≤1.5*phase voltage peak value, and the common-mode voltage jump≤1500V/uS.

In the embodiments of the present disclosure, when the inductor includes a differential-mode inductor and a common-mode inductor, the differential-mode inductor Ldiff is connected between the AC power grid and the first-stage converter, and the common-mode inductor Lcm is disposed between the differential-mode inductor and the second-stage converter.

Figure 15:
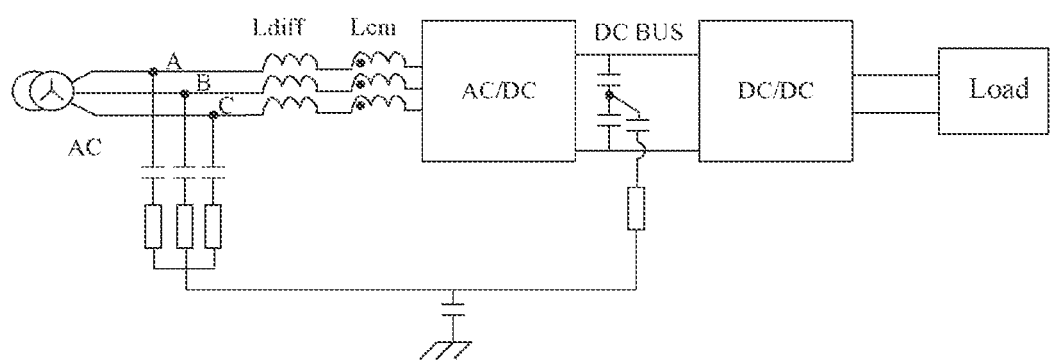
FIG. 15 schematically shows a structural schematic diagram of yet another conversion device in an embodiment of the present disclosure.
Figure 16:
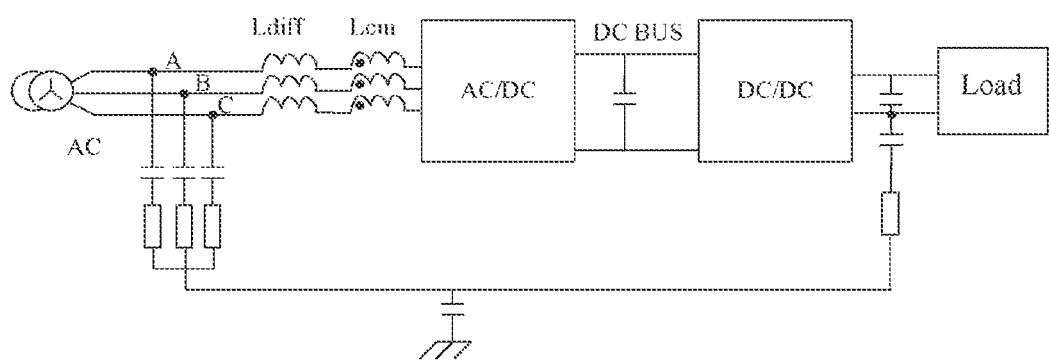
FIG. 16 schematically shows a structural schematic diagram of yet another conversion device in an embodiment of the present disclosure.

For example, as shown in FIG. 15 and FIG. 16, the conversion device includes differential-mode inductors Ldiff and common-mode inductors Lcm of three phases. In each phase of the three phases, the differential-mode inductor Ldiff and the common-mode inductor Lcm are connected in series, and are electrically connected between the AC power grid and the first-stage converter. Herein, the common-mode inductor and the differential-mode inductor are designed independently and are disposed at an access end of the AC power grid after connected in series.

Figure 17:
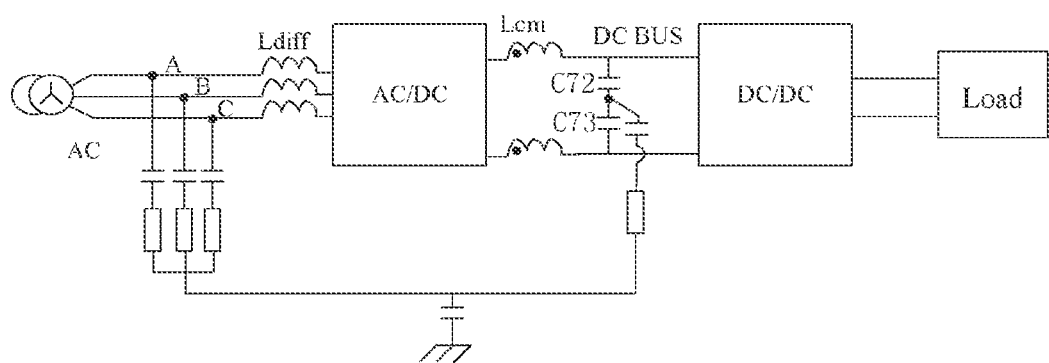
FIG. 17 schematically shows a structural schematic diagram of yet another conversion device in an embodiment of the present disclosure.
Figure 18:
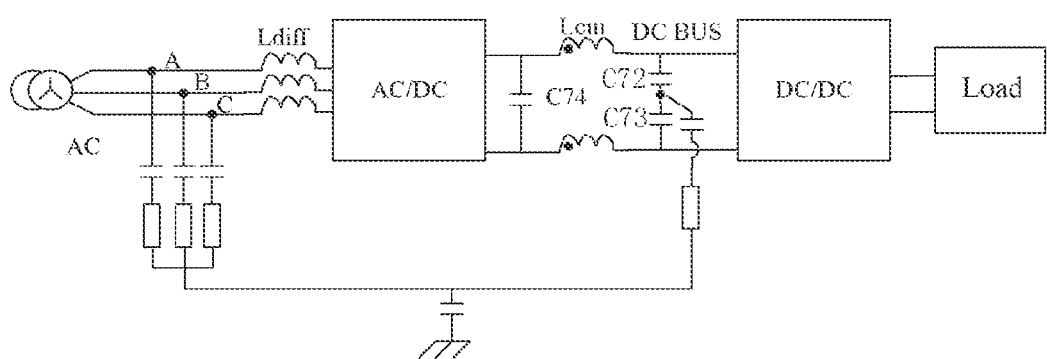
FIG. 18 schematically shows a structural schematic diagram of yet another conversion device in an embodiment of the present disclosure.
Figure 19:
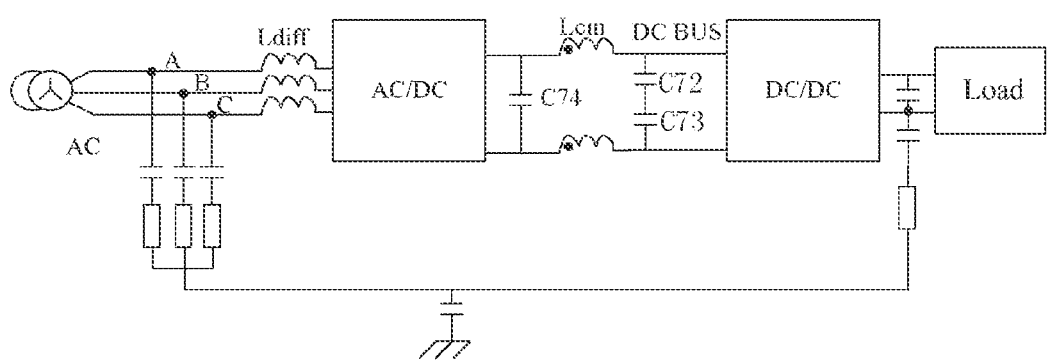
FIG. 19 schematically shows a structural schematic diagram of yet another conversion device in an embodiment of the present disclosure.

As shown in FIGS. 17, 18 and 19, the common-mode inductor Lcm and the differential-mode inductor Ldiff can be independently designed, and the differential-mode inductors Ldiff of three phases are respectively electrically connected between the AC power grid and the first-stage converter. The common-mode inductors Lcm of two phases are respectively disposed at two terminals of the DC bus, that is, between the AC power grid and the second terminal of the second-stage converter, and may further be located between the first terminal and the second terminal of the filtering network.

In FIG. 17, the common-mode inductor Lcm is disposed between the second terminal of the first-stage converter and a series connection branch formed by a second capacitor C72 and a third capacitor C73 connected in series. In FIGS. 18 and 19, the common-mode inductor Lcm is disposed between a fourth capacitor C74 and a series connection branch formed by the second capacitor C72 and the third capacitor C73 connected in series. At this point, the fourth capacitor C74 can absorb leakage inductance energy of a leakage inductance of the common-mode inductor to solve the influence of a leakage inductance of the common-mode electric reactor.

Figure 20:
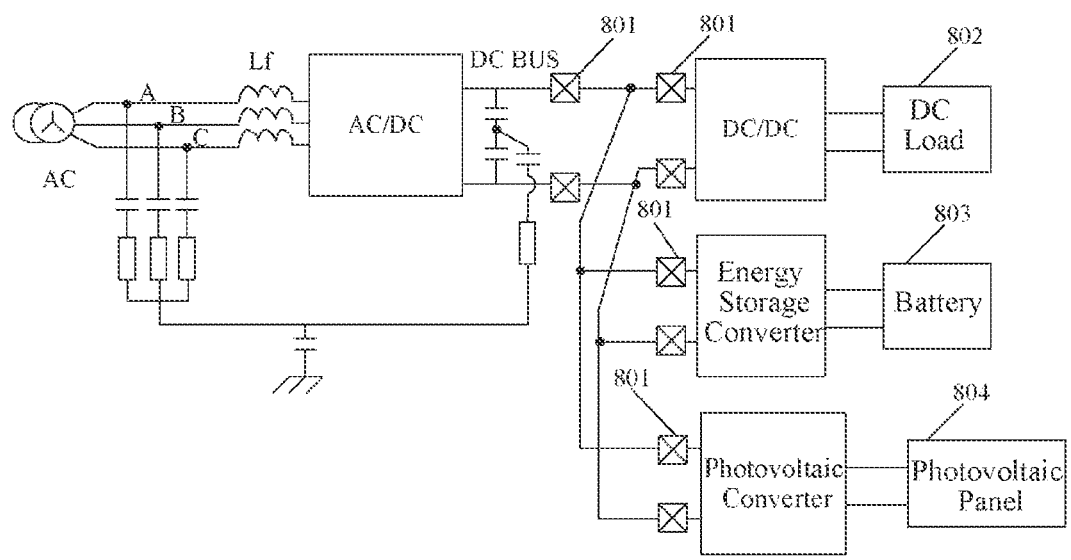
FIG. 20 schematically shows a structural schematic diagram of yet another conversion device in an embodiment of the present disclosure, FIG. 21 schematically shows a structural schematic diagram of yet another conversion device in an embodiment of the present disclosure, and FIG. 22 schematically shows a structural schematic diagram of yet another conversion device in an embodiment of the present disclosure.

In the embodiments of the present disclosure, the conversion device further includes a controller (not shown in the figure). The controller detects power of the load and controls operating states of the at least two AC-DC converters connected in parallel according to the power of the load. As shown in FIG. 20, the conversion device further includes a DC circuit breaker 801. The DC circuit breaker 801 is disposed between the first-stage converter and the second-stage converter, and is electrically connected to the controller. Operations of the DC circuit breaker 801 are controlled according to a control signal sent by the controller.

In the medium-voltage DC micro-grid system, a joining of a new energy body is easier, cost of constructing wires is low, and loss is small. Furthermore, there is no problem of reactive power balance and stability, and the reliability of the power grid operation is higher. Based on the advantages of the DC micro-grid, as shown in FIG. 20, in the DC micro-grid system of the embodiments of the present disclosure, a new energy body such as a DC load 802, a battery 803, and a photovoltaic panel 804 can be connected, thereby realizing power generation and power consumption of the DC micro-grid and a bidirectional flow of energy.

The DC power grid has the disadvantages of low inertia, rapid rise of short-circuit current when the short circuit occurs and high peak current. For the short circuit fault of the DC micro-grid, it is proposed to connect the DC circuit breaker 801 in series at an access end of the energy body to achieve reliable disconnection when the short circuit fault occurs.

In architecture of the medium-voltage DC micro-grid according to the embodiments of the present disclosure, the new energy body such as the battery and the photovoltaic panel and the medium-voltage DC bus are connected and disconnected through the DC circuit breaker 801. The DC circuit breaker 801 can detect operating conditions by itself. When a fault occurs, a fault point is disconnected and information is transmitted to the controller at the same time. The controller performs overall management based on the uploaded signal. The overall management can be: a fault priority is set by the controller, for example, short circuit is a first priority, and overcurrent is a second priority. When the fault is at the first priority, the DC circuit breaker will cut off by itself when finding the fault; while the fault is at the second priority or a lower priority, the controller sends a cut-off signal to control on/off of the DC circuit breaker according to the information of the DC circuit breaker.

The topology structure shown in FIG. 20 integrates the power grid, the load, the power generation, the energy storage and the like. A central control system where the controller is originated can receive control instructions of a monitoring system to charge and discharge the battery. An energy storage system where the battery is located is used to quickly absorb or release energy. Furthermore, the topology structure can smooth voltage fluctuations caused by the power generation via a parallel-connected photovoltaic device, improve system's balance level of the active power and reactive power, and enhance stability. The energy storage system can be used to improve dispatch ability of photovoltaic power generation, and by analyzing a distribution of a local power peak-valley time and electricity price, a charge-discharge control mode can be formulated to achieve low absorption and high throw, thereby maximizing economic benefits. The energy storage system cooperates with the photovoltaic power station to further improve a good matching between the photovoltaic power generation and the power grid. By smoothing the power output and achieving 'peak-cutting and valley-filling', a problem of 'large installed capacity and small power generation' of photovoltaic power generation is alleviated, thereby greatly reducing requirements of conventional photovoltaic power plants for the power transmission capacity of the power grid, so as to avoid the constraints of insufficient power grid construction on the power generation of the photovoltaic power plants.

Figure 21:
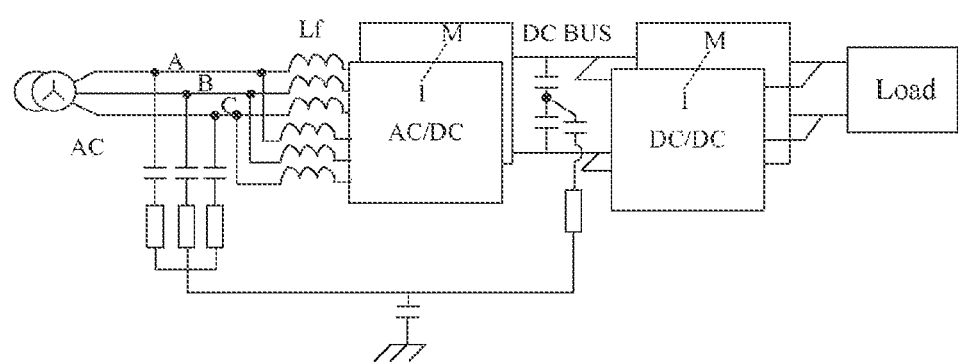
Figure 22:
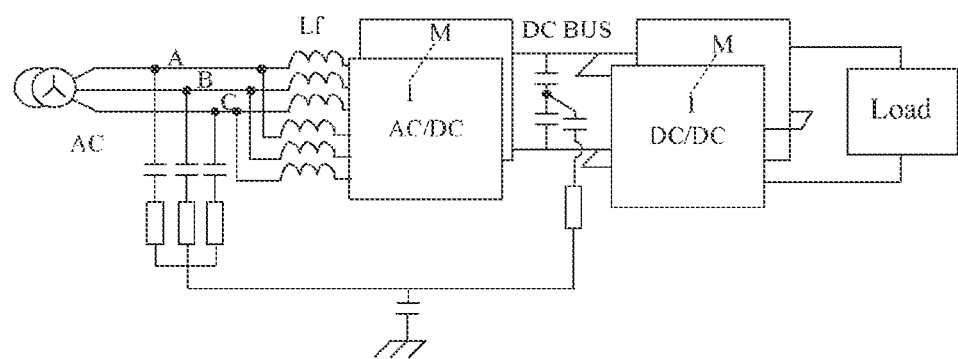

As shown in FIGS. 21 and 22, the first-stage converter may include two or more AC-DC converters connected in parallel. The second-stage converter may include two or more DC-DC converters. As shown in FIG. 21, there are M DC-DC converters in the second-stage converter, where M is a natural number greater than or equal to 2. As shown in FIG. 22, M DC-DC converters in the second-stage converter are connected in series, where M is a natural number greater than or equal to 2. In addition, the second-stage converter may also include two or more DC-AC converters, and the two or more DC-AC converters may be connected in parallel or in series.

In the embodiments of the present disclosure, in a case where the load is fully loaded, all the AC-DC converters are operating. In a case where the load is lightly loaded or half loaded, the controller controls some of the at least two AC-DC converters connected in parallel to work, and controls remaining of the at least two AC-DC converters connected in parallel not to work.

For example, as shown in FIG. 21, the AC/DC converter in the conversion device adopts a way of multi-machines connected in parallel, and an output side of the DC/DC converter also adopts a way of multi-machines connected in parallel. When the load side is fully loaded, the multiple AC/DC converters are all working, and when the load side is lightly loaded or half loaded, according to the power of the load, the controller may shut down some of the AC/DC converters, and make the remaining of the AC/DC converters operate at a rated load or a best efficiency operating point to achieve the purpose of maximizing efficiency.

As shown in FIG. 22, the AC/DC converter in the conversion device adopts a way of multi-machines connected in parallel, and according to a voltage demand of the load, an output side of the DC/DC converter can operate in a way that secondary side outputs of the multiple AC/DC converter are connected in serial to supply power. When the load side is fully loaded, the multiple AC/DC converters work, and when the load side is lightly loaded or half loaded, according to the power of the load, the controller may shut down some of the AC/DC converters, and make the remaining of the AC/DC converters operate at the rated load or the best efficiency operating point to achieve the purpose of maximizing efficiency.

In addition, in many practical applications, it may be inconvenient for transporting a conversion device to a floor where a power consumption terminal is located. If the entire conversion device is placed on the power consumption terminal, not only does it have the problem of transportation, it also takes up a large floor area and increases the load on the floor. In the conversion device of the embodiments of the present disclosure, the first-stage converter and the second-stage converter may be placed separately, and the first-stage converter may be placed at a remote end such as a basement. The second-stage converter can close to the power consumption terminal and the two are connected through the medium-voltage DC power grid.

The conversion device according to the embodiment of the present invention includes a first-stage converter and a second-stage converter. A plurality of semiconductor devices connected in series are provided on a upper arm and a lower arm of each switch bridge arm of the first-stage converter, so that the switching frequency of each semiconductor device becomes higher, therefore the first-stage converter can work at a relatively high switching frequency, which increases the cut-off frequency of the filter, reduces the size of the filter, and reduces the cost of the filter.

Other embodiments of the present disclosure will be apparent to those skilled in the art after consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:

1. A conversion device, connected between an alternating current (AC) power grid and a load, wherein the conversion device comprises:

an inductor, electrically connected to the AC power grid;

a first-stage converter having a first terminal electrically connected to the inductor and a second terminal electrically connected to a bus, and the first-stage converter being configured to output a bus voltage according to the AC power grid, wherein the first-stage converter comprises an N-level alternating current-direct current (AC-DC) converter, and the N-level AC-DC converter comprises a plurality of switch bridge arms, wherein both an upper bridge arm and a lower bridge arm of each of the plurality of switch bridge arms of the N-level AC-DC converter include a plurality of semiconductor devices connected in series, and a rated withstand voltage Vsemi of each of the plurality of semiconductor devices is greater than or equal to $(Vbus*\delta)/((N-1)*Nseries*\lambda)$, where Vbus represents the bus voltage, $\delta$ represents bus fluctuation, N represents a number of levels of the first-stage converter, $\lambda$ represents a voltage derating coefficient of a respective semiconductor device of the plurality of semiconductor devices, and $\lambda \leq 1$, and Nseries represents a number of semiconductor devices of the plurality of semiconductor devices connected in series, and Nseries$\geq$2; and a second-stage converter having a first terminal electrically connected to the bus and a second terminal electrically connected to the load, and the second-stage converter being configured to convert the bus voltage into an output voltage to supply energy to the load;

wherein the conversion device further comprises a controller and a direct current (DC) circuit breaker, and the DC circuit breaker is disposed between the first-stage converter and the second-stage converter, wherein the DC circuit breaker is electrically connected with the controller, and the DC circuit breaker is controlled to operate according to a control signal sent by the controller;

wherein the conversion device further comprises a filtering network, having a first terminal, a second terminal and a third terminal, wherein a first resistance-capacitance circuit is disposed between the first terminal and the third terminal of the filtering network, and a second resistance-capacitance circuit is disposed between the second terminal and the third terminal of the filtering network, and the first terminal of the filtering network is electrically connected to the AC power grid, the second terminal of the filtering network is connected to a terminal of the bus or the second terminal of the second-stage converter, and the third terminal of the filtering network is grounded through a first capacitor; and wherein the inductor comprises a differential-mode inductor and a common-mode inductor, the differential-mode inductor is connected between the AC power grid and the first-stage converter, and the common-mode inductor is disposed between the first terminal and the second terminal of the filtering network.

2. The conversion device according to claim 1, wherein the load comprises a direct current (DC) load, and the second-stage converter comprises a direct current-direct current (DC-DC) converter, the DC-DC converter is electrically connected to the DC load.

3. The conversion device according to claim 1, wherein the load comprises an alternating current (AC) load, and the second-stage converter comprises a direct current-alternating current (DC-AC) converter, the DC-AC converter is electrically connected to the AC load.

4. The conversion device according to claim 1, wherein the first-stage converter comprises at least two alternating current-direct current (AC-DC) converters connected in parallel.

5. The conversion device according to claim 4, wherein the second-stage converter comprises at least two direct current-direct current (DC-DC) converters or direct current-alternating current (DC-AC) converters, the at least two DC-DC converters or DC-AC converters being connected in parallel or connected in series.

6. The conversion device according to claim 4, wherein the controller is configured to detect power of the load and controls operating states of the at least two AC-DC converters connected in parallel according to the power of the load.

7. The conversion device according to claim 6, wherein, in case of the load is fully loaded, the at least two AC-DC converters operate normally.

8. The conversion device according to claim 6, wherein, in case of the load is half loaded or less, the controller controls a portion of the at least two AC-DC converters connected in parallel to operate normally, and controls the remaining of the at least two AC-DC converters connected in parallel to stop operating.

9. The conversion device according to claim 1, wherein the N-level AC-DC converter comprises any one of the following:
a two-level rectifier, a three-level Vienna rectifier, and a three-level neutral point clamped converter.

10. The conversion device according to claim 1, wherein a second capacitor and a third capacitor connected in series are disposed across the bus, and the second terminal of the filtering network is electrically connected with the second capacitor and the third capacitor.

11. The conversion device according to claim 1, wherein a fourth capacitor is connected across the bus.

12. The conversion device according to claim 1, wherein the first resistance-capacitance circuit comprises a first resistor and a fifth capacitor connected in series, and the second resistance-capacitance circuit comprises a second resistor and a sixth capacitor connected in series.

* * * * *